US012669203B2

(12) United States Patent
Guibert et al.

(10) Patent No.: US 12,669,203 B2
(45) Date of Patent: Jun. 30, 2026

(54) COUPLING DEVICE FOR A TUBE

(71) Applicant: A. Raymond et Cie, Grenoble (FR)

(72) Inventors: Kévin Guibert, Grenoble (FR); Jérôme Chaupin, Bret en Belledonne (FR)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 18/699,656

(22) PCT Filed: Sep. 30, 2022

(86) PCT No.: PCT/EP2022/077281
§ 371 (c)(1),
(2) Date: Oct. 1, 2024

(87) PCT Pub. No.: WO2023/061772
PCT Pub. Date: Apr. 20, 2023

(65) Prior Publication Data
US 2025/0327540 A1      Oct. 23, 2025

(30) Foreign Application Priority Data

Oct. 15, 2021      (FR) ...................................... 2110989

(51) Int. Cl.
*F16L 37/098*          (2006.01)
(52) U.S. Cl.
CPC ......... *F16L 37/098* (2013.01); *F16L 2201/10* (2013.01)
(58) Field of Classification Search
CPC ..... F16L 37/098; F16L 37/123; F16L 37/138; F16L 37/50; F16L 37/505; F16L 37/084; F16L 37/0847; F16L 37/092; F16L 37/0926
See application file for complete search history.

(56) References Cited

U.S. PATENT DOCUMENTS 5,423,578 A * 6/1995 Kanomata ........... F16L 25/0036
                                                      285/903

FOREIGN PATENT DOCUMENTS

EP          2249072 A1     11/2010
FR          3021089 A1     11/2015
JP          07-035281 A     2/1995
WO      2021/148737 A1      7/2021

OTHER PUBLICATIONS

French Search Report for Application No. 899662 dated May 5, 2022, 2 pages.
International Search Report for Application No. PCT/EP2022/077281 dated Dec. 12, 2022, 2 pages.
International Written Opinion for Application No. PCT/EP2022/077281 dated Dec. 12, 2022, 6 pages.

* cited by examiner

*Primary Examiner* — Aaron M Dunwoody
(74) *Attorney, Agent, or Firm* — TraskBritt

(57) ABSTRACT

A coupling device includes a hollow body defining a housing having an opening, a locking ring arranged in the housing and intended to engage with an inserted tube, a first stop, a cartridge against which the tube is intended to abut in order to impose a connection state on the cartridge, and a spring exerting a force against the cartridge. The cartridge can slide between a first and a second position. The passage of the cartridge from the second position the first position causes the locking ring to abut against the first stop, and the passage of the cartridge from the first position to the second position places the locking ring at a distance from the first stop.

18 Claims, 5 Drawing Sheets

COUPLING DEVICE FOR A TUBE

CROSS REFERENCE TO RELATED APPLICATIONS

This application is a national phase entry under 35 U.S.C. § 371 of International Patent Application PCT/EP2022/077281, filed Sep. 30, 2022, designating the United States of America and published as International Patent Publication WO 2023/061772 A1 on Apr. 20, 2023, which claims the benefit under Article 8 of the Patent Cooperation Treaty to French Patent Application Serial No. FR2110989, filed Oct. 15, 2021.

TECHNICAL FIELD

The present disclosure relates to the field of fluid coupling devices implemented in fluid circulation and/or distribution systems.

More particularly, the present disclosure relates to a device for coupling a tube, provided with means making it possible to verify the correct state of connection of the tube to the coupling device. In particular, the present disclosure proposes a device for coupling a tube and provided with a haptic indicator of good connection.

BACKGROUND

Today, fluid coupling devices are widely used in motor vehicles and road transport vehicles. These fluid coupling devices are, in particular, implemented to ensure the circulation and/or distribution of a fluid within these vehicles.

Furthermore, in order to ensure assembly rates compatible with the requirements of the automotive and/or road transport vehicle industries, it may be necessary to have fluid coupling devices enabling quick connections and means for verifying their assembly.

In this respect, document [1] cited at the end of the description discloses a coupling device enabling the fluid connection of a tube or duct, which comprises a visual mounting indicator.

In particular, this coupling device comprises a hollow body that is substantially cylindrical and has a receiving housing opening onto an insertion opening. A locking ring as well as a seal are also arranged in the receiving housing and arranged to secure a tube inserted into the receiving housing through the insertion opening in an insertion direction.

The coupling device also comprises a cartridge capable of being locked in either a first or a second position in the receiving housing. The cartridge initially locked in the first position partially protrudes from the receiving housing through the insertion opening. The insertion of a predetermined length into the receiving housing, along the insertion direction, allows the cartridge to be unlocked and slid from the first position to the second position wherein the cartridge is fully integrated into the receiving housing.

The complete insertion of the cartridge into the receiving housing makes it possible to conclude that the tube is properly connected with the coupling device. However, there are situations for which the conditions of illumination and/or the cramped conditions of the coupling areas on the vehicles prevent the observation of the position of the cartridge and thus make the function of visual control of the cartridge inefficient.

Alternatively, it has been possible to provide the coupling device with an audible indicator. Document [2] cited at the end of the description discloses an example of this. In particular, the coupling device described in this document comprises an audible indicator formed by an elastic pin configured to jiggle once a predetermined length of the tube is pushed into the coupling device. However, a noisy environment makes sound detection difficult.

Again alternatively, document [3] cited at the end of the description discloses a coupling device that comprises a haptic indicator of correct assembly of the tube. The coupling device described in this document is provided, in an inner channel, with an abutment against which the tube exerts a force until the abutment breaks, signaling the correct insertion of the tube. However, breaking the abutment prevents any subsequent verification of the correct assembly of the tube in the inner channel.

One aim of the present disclosure is therefore to propose a coupling device configured to allow the proper connection of a tube in noisy, dark and/or cramped environments.

Another aim of the present disclosure is to propose a coupling device provided with an indicator of proper mounting of a tube capable of being activated as many times as necessary.

BRIEF SUMMARY

The present disclosure relates to a coupling device of a tube comprising:
- a hollow body defining a housing that comprises an opening through which a tube is intended to be inserted by sliding in a direction of insertion;
- a locking ring arranged in the housing coaxially with the direction of insertion and intended to engage with a tube inserted into the housing;
- a first stop that is arranged in the housing upstream of the locking ring in the direction of insertion and against which the ring is capable of abutting;
- a cartridge against which the tube, inserted by a predetermined length and in engagement with the locking ring, is intended to abut in order to impose a connection state on the cartridge, the cartridge, in the connection state, being able to slide between a first and a second position in order to accompany the sliding of the tube in engagement with the locking ring, the passage of the cartridge from the second to the first position forcing the tube to slide in a direction of extraction that is opposite to the direction of insertion in order to cause the locking ring to abut against the first stop, while the passage of the cartridge from the first to the second position allows the tube to slide in the direction of insertion in order to place the locking ring at a distance from the first stop;
- a spring that exerts a force against the cartridge in the direction of extraction in order to force the cartridge, in the connection state, to adopt its first position.

According to one embodiment, the housing is delimited by an inner surface of the hollow body, which has a rotational symmetry about a main axis parallel to the direction of insertion.

According to one embodiment, the cartridge comprises a sleeve that extends from a free end in the direction of insertion, and is intended to guide the tube during the insertion of the tube into the housing.

According to one embodiment, the cartridge can be held, by at least one locking means, in a state referred to as the locked state, wherein the cartridge is prevented from sliding toward the second position, the passage from the locked state to the connection state being induced by the insertion, in the direction of insertion, of a length of tube equal to the predetermined length.

According to one embodiment, the locking means comprises a second stop and a flexible lever, the second stop being formed on the inner surface, while the flexible lever, supported by the sleeve, extends divergently with respect to the sleeve and comprises an end, referred to as the blocking end, intended to abut the second stop when the cartridge is in the locked state, and the flexible lever is configured to bend convergently inside the sleeve during insertion of the tube in order to position the blocking end so as to be set back from the second stop.

According to one embodiment, the sleeve comprises an end stop opposite the free end thereof, against which stop the tube is intended to abut upon insertion into the housing by a length at least equal to the predetermined length.

According to one embodiment, the cartridge comprises a lining mechanically secured to the sleeve via an end of the sleeve that is opposite the free end, the lining comprising a flange against which the spring exerts its force on the cartridge.

According to one embodiment, the cartridge comprises a lug that, when the cartridge is in the locked state, is located in a slot of the locking ring in order to impose a stress thereon, resulting in a spacing greater than a spacing in the free state of the locking ring.

According to one embodiment, the locking ring and the cartridge are arranged so as to adopt a state, referred to as the engagement state, wherein the locking ring, which is split, is forced by the cartridge to a stressed state, resulting in a spacing, referred to as the second spacing, that is greater than the spacing of the ring in the free state, referred to as the first spacing, the passage from the engagement state to the connection state of the cartridge being induced by the insertion of the predetermined tube length in such a way as to cause the cartridge to slide in the direction of insertion and bring the locking ring into engagement with the tube.

According to one embodiment, the cartridge comprises a collar, and the locking ring comprises, in the direction of insertion, a first section and a second section, the first section being intended to ensure the engagement between the insertion ring and the tube, and the second section, which extends over a length L, being intended to interact with the collar so as to have the second spacing imposed when the cartridge is in the engagement state.

According to one embodiment, the collar is engaged slidingly in the second section of the locking ring when the cartridge is in the engaged state so as to impose the second spacing on the locking ring.

According to one embodiment, the inner surface of the hollow body comprises, in the direction of insertion, a first part of a first diameter and a second part of a second diameter that is smaller than the first diameter, so as to form an engagement shoulder that the second section is intended to abut during the passage from the engagement state to the connection state of the cartridge in order to release the locking ring.

According to one embodiment, the spring also exerts its force against the collar.

According to one embodiment, a dust cover ring is arranged in the opening upstream of the first stop in the direction of insertion, the dust cover ring advantageously being in engagement with the hollow body by means of snap-fitting.

According to one embodiment, an O-ring is arranged in the housing upstream of the first abutment according to the insertion direction, the dust cover ring covering the O-ring.

According to one embodiment, the first stop forms a ring at least partially embedded in the dust cover ring.

According to one embodiment, another O-ring is also arranged downstream of the locking ring in the insertion direction.

According to one embodiment, the inner surface of the hollow body comprises a stop shoulder against which the spring bears.

BRIEF DESCRIPTION OF THE DRAWINGS

Other features and advantages of the invention will emerge from the following detailed description of embodiments of the present disclosure with reference to the appended figures, wherein:

FIG. 1 shows the coupling device according to a cutting plane passing through the main axis AA' of the coupling device;

FIG. 8 shows the coupling device according to a cutting plane passing through the main axis AA' of the coupling device;

FIG. 10 shows the coupling device according to a cutting plane passing through the main axis AA' of the coupling device and in the connected state.

DETAILED DESCRIPTION

The present disclosure relates to a coupling device intended to provide a fluid connection, advantageously sealed, between a tube or a duct and a female element (not shown in the figures). This connection can, in particular, be implemented in a flow and/or distribution system of a fluid (for example, a liquid such as water or oil, or a gas, or air) in the automotive field, in particular, in cars or any other type of commercial vehicle such as buses, trucks, trailers, etc. However, the invention is not limited to these fields alone, and can also be implemented in the railway and/or aeronautical fields.

Figure 1:
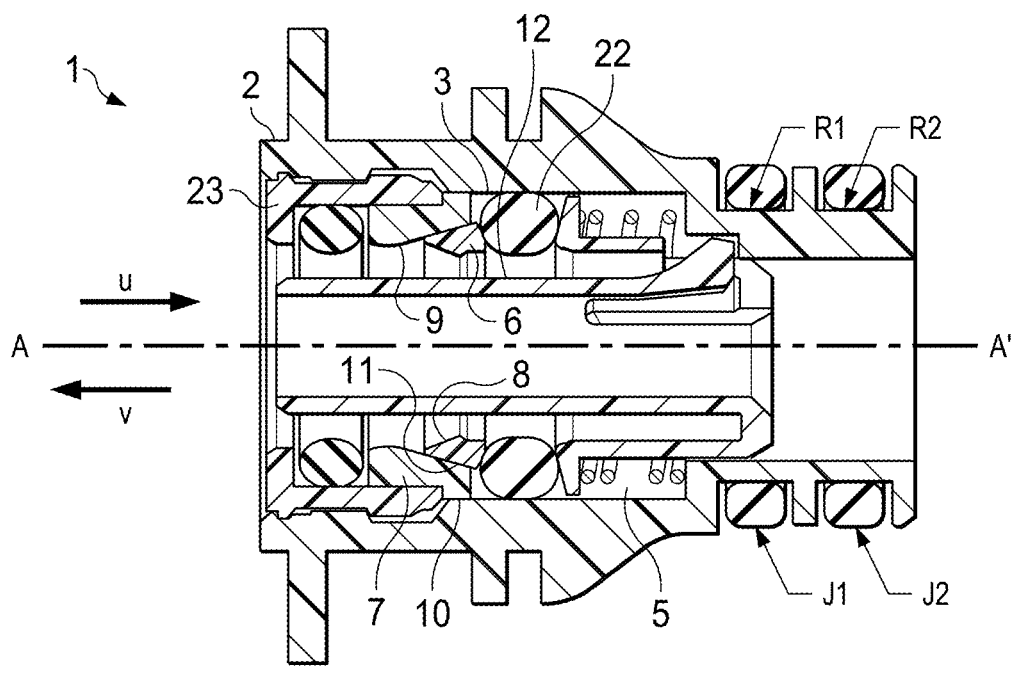
FIG. 1 is a schematic representation of a coupling device according to one exemplary embodiment of the present disclosure. In particular.

In FIG. 1, a coupling device 1 according to one embodiment of the present disclosure can be seen. The principles set out below are not limited just to the arrangement shown in this example. In particular, a person skilled in the art, based on what follows, could consider other configurations. In particular, the coupling device 1 according to this embodiment is shown along a cutting plane passing through an axis, called the main axis AA', of the coupling device 1.

Figure 2:
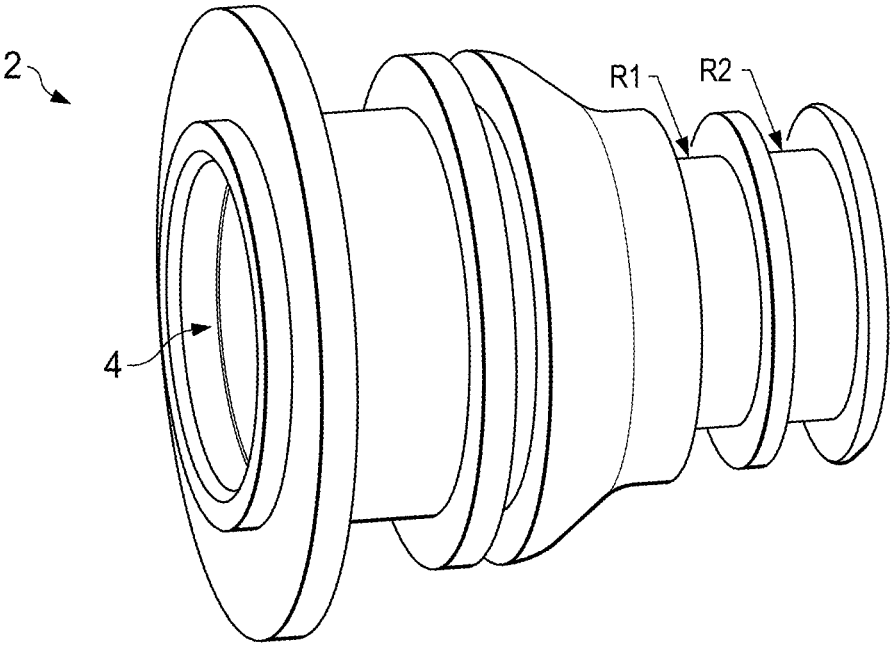
FIG. 2 is a schematic representation of the hollow body implemented in the example of FIG. 1 and according to a perspective view making it possible to observe the opening through which the tube is intended to be inserted.

In particular, the coupling device 1 comprises a hollow body 2 that has a housing 3 opening out through an opening 4 (FIG. 2). The opening 4, in particular, allows the insertion of a tube in an insertion direction u along the direction defined by the main axis AA'. The housing 3 is delimited by an inner surface 5 of the hollow body 2 and that has a rotational symmetry about the main axis AA'.

The exterior surface of the hollow body 2 may comprise one or more circumferential grooves R1, R2 intended to receive one or more O-rings J1, J2 making it possible to ensure a sealed junction with a female element.

The coupling device 1 comprises a locking ring 6 and a first stop 7 making it possible to secure a tube capable of being inserted into the housing in the insertion direction u. More particularly, the locking ring 6 and the first stop 7 are arranged to prevent the extraction of the tube when the tube is inserted into the housing 3 and is engaged with the locking ring 6.

In this respect, the locking ring 6 can be provided with attachment means allowing it to be engaged with the tube. More particularly, the locking ring 6 may have a tapered inner cross-section 8 making it possible to grip the outer surface of the tube, and thus be engaged with the tube.

"Engaged" is understood to mean two elements mechanically secured to one another. The expression "engaged" also has a reciprocal nature such that a first element engaged with a second element implies that the second element is engaged with the first element. Thus, and throughout the description, once the locking ring is engaged with the tube, the tube is engaged with the locking ring.

For its part, the first stop 7 is arranged upstream of the locking ring 6 in the insertion direction u so as to constitute an obstacle against which the locking ring 6 is likely to abut. Particularly advantageously, the first stop 7 can be formed by a ring whose axis of revolution coincides with the main axis AA', and that is in fixed connection in the housing 3 of the hollow body 2.

Thus, an extraction force, in an extraction direction v (opposite the direction of insertion u), on a tube with which the locking ring 6 is engaged will position the latter in abutment against the first stop 7 and thus prevent the removal of the tube.

Again advantageously, the first stop 7 may also comprise an inner surface 9, opposite its peripheral surface 10, having a divergent tapered shape in the insertion direction u. The latter aspect makes it possible to force the locking ring 6 against the tube during the application of an extraction force. In a complementary manner, the locking ring 6 may comprise a peripheral surface 11 that also has a divergent shape tapered in the insertion direction u. This aspect has the effect of reinforcing the stress effect imposed by the first stop 7 on the locking ring 6 once an extraction force is exerted on a tube engaged with the locking ring 6.

"Divergent surface tapered in the insertion direction u" refers to a shape that widens in the insertion direction u.

The coupling device 1 according to the present disclosure also comprises a cartridge 12.

In particular, the cartridge 12 is arranged in the housing 3 and is capable of adopting a so-called connection state. The connection state is, in particular, imposed on the cartridge 12 once a predetermined length D of tube is inserted into the housing 3 in the insertion direction u and is located at one of its ends, referred to as insertion end E, abutting against the cartridge 12.

Advantageously, the cartridge 12 comprises a sleeve 13 that extends from a free end 12a along the insertion direction u.

Figure 3:
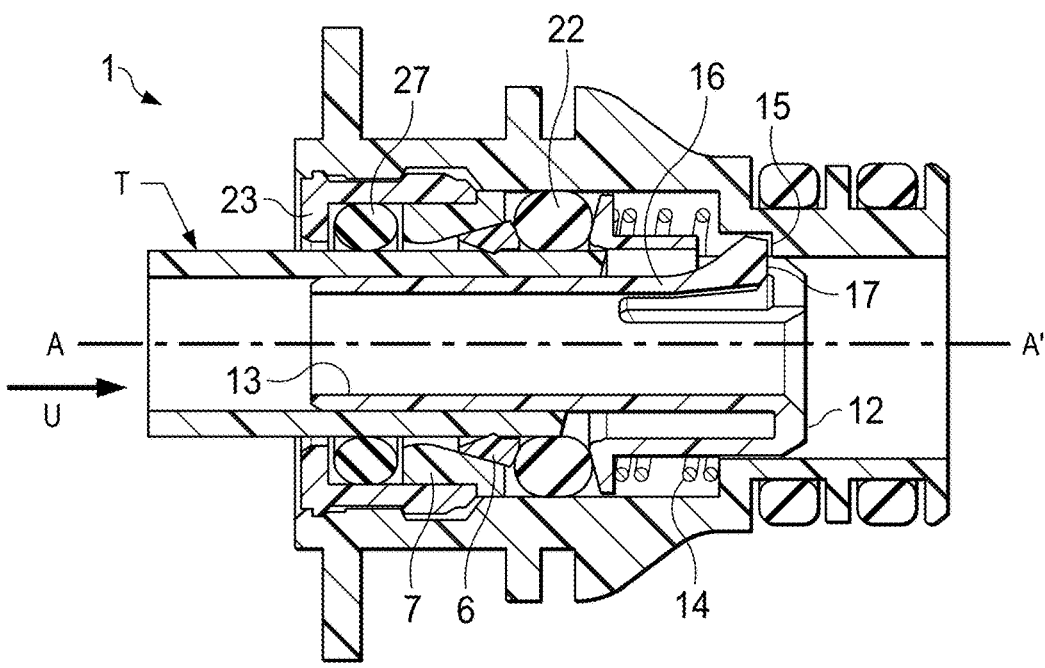
FIG. 3 shows the coupling device of FIG. 1 according to the cutting plane passing through the main axis AA', and wherein a length of tube, less than the predetermined length, is inserted into the housing through the opening and in the insertion direction.

FIG. 3 is an illustration of the coupling device 1 wherein a length of tube T shorter than the predetermined length is inserted into the housing through the opening 4 in the direction of insertion. In this FIG. 3, the locking ring 6 is engaged with the tube T. In other words, the insertion end E of the tube T is downstream of the locking ring 6 in the insertion direction u. However, since the inserted length of tube T remains less than the predetermined length D, the tube T is not abutted against the cartridge 12.

Figure 4:
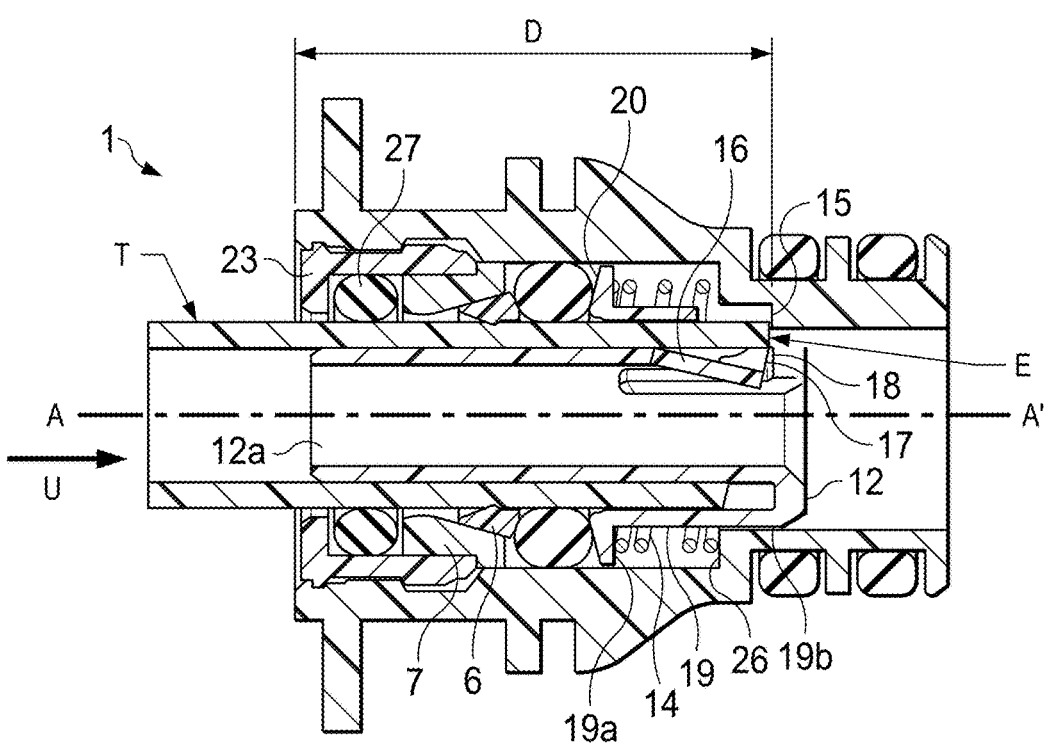
FIG. 4 shows the coupling device of FIG. 1 according to the cutting plane passing through the main axis AA', and wherein a length of tube, equal to the predetermined length, is inserted into the housing through the opening and in the insertion direction, the cartridge, in its connection state, adopting its first position.

FIG. 4 shows a subsequent stage of inserting the tube T into the housing 3 in the insertion direction. In particular, FIG. 4 shows the coupling device 1 of FIG. 3 wherein the predetermined length D of the tube T is inserted into the housing 3 in the insertion direction u. At this stage of insertion, the tube T is in abutment by its insertion end against the cartridge 12 and is engaged with the locking ring 6.

According to the present disclosure, in its connection state, the cartridge 12 is capable of sliding along either the insertion direction or the extraction direction, between a first position and a second position in order to accompany the sliding of the tube engaged with the locking ring 6. "Accompany the sliding" means the tube, the locking ring and the cartridge 12 move as an assembly in the same direction.

In other words, the sliding of the cartridge 12 according to either the insertion direction u or the extraction direction v over a given distance can be accompanied by the same movement of the tube T and the locking ring 6.

In this respect, the first position is a position upstream of the second position in the insertion direction u, and for which the locking ring 6 is in abutment against the first stop 7 (this aspect is, in particular, shown in FIG. 4).

Figure 5:
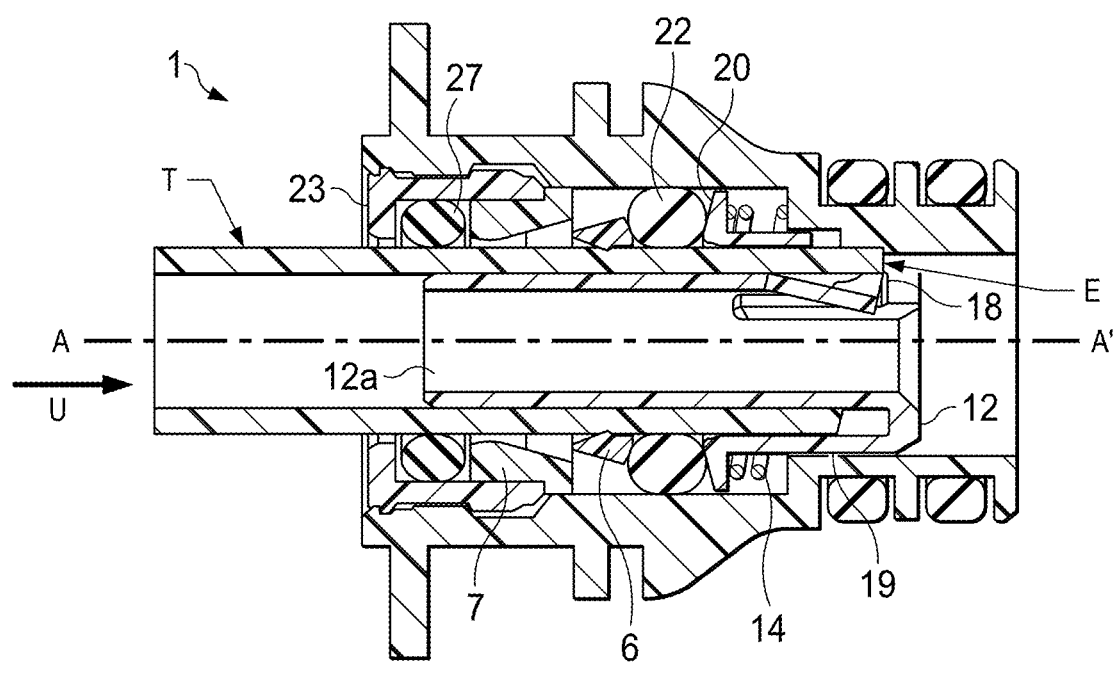
FIG. 5 shows the coupling device of FIG. 1 according to the cutting plane passing through the main axis AA', and wherein a length of tube, equal to the predetermined length, is inserted into the housing through the opening and in the insertion direction, the cartridge, in its connection state, adopting its second position.

As shown in FIG. 5, the cartridge 12, once it is in the connection state, can slide in the direction of insertion u from the first position to the second position. This sliding from the first position to the second position may, for example, be induced by a force exerted by the tube T, in the insertion direction u, abutting against the cartridge 12. In other words, the sliding of the cartridge 12 from the first to the second position is accompanied by a movement of the tube, the locking ring and the cartridge together. Furthermore, this assembly movement positions the locking ring 6 at a distance from the first stop 7.

The coupling device 1 according to the present disclosure further comprises a spring 14 arranged to exert a force against the cartridge 12 in the direction of extraction in order to force the cartridge 12, in the connection state, to adopt its first position.

In other words, the spring 14, as arranged, makes it possible to secure the movement of the tube T, the locking ring 6 and the cartridge 12. In particular, by default, the cartridge 12 is in its first position under the effect of the force exerted by the spring 14 and therefore forces the locking ring 6 to abut against the first stop 7. In contrast, a force exerted on the tube T in the insertion direction u causes the tube T, the locking ring 6 and the cartridge 12 to slide together. Releasing this force returns the cartridge 12 to its first position and will thus position the locking ring 6 in abutment against the first stop 7.

Thus, once the cartridge 12 is in the connection state, the assembly formed by the tube T, the locking ring 6 and the cartridge 12 can have back-and-forth movements imposed on it in the direction defined by the main axis AA'. In other words, an operator wishing to verify the correct connection of the tube T to the coupling device 1 can exert a force in the direction of insertion u on the tube T in order to cause the cartridge to slide from its first position to its second position. Releasing this force will return the cartridge 12 to its first position under the effect of the spring 14. This sequence will reveal, on the one hand, an insertion of the predetermined length D of the tube T into the coupling device and, on the other hand, the engagement effect with the locking ring.

This operation performed manually can be carried out in cramped, unlit and/or noisy places, thus making it possible to effectively and unambiguously verify the correct connection of the tube in the coupling device.

According to a particular embodiment of the present disclosure, the coupling device 1 can comprise a locking means. In particular, the locking means can be arranged to hold the cartridge 12 in a state, called locked state, wherein any sliding of the cartridge 12 to the second position is prohibited. More particularly, the locking means can be arranged to cooperate with the tube T in order to allow cartridge 12 to pass from the locked state to the connection state.

In particular, the passage of the cartridge 12 from the locked state to the connection state can be induced by inserting a length of tube T equal to the predetermined length.

Thus, and as shown in FIG. 3, the locking means comprises a second stop 15 and a flexible lever 16. More particularly, the second stop 15 is formed on the inner surface 5, while the flexible lever 16, borne by the sleeve 13, extends divergently relative to the sleeve 13 and comprises an end, called the locking end 17, intended to abut against the second stop when the cartridge 12 is in the locked state.

The flexible lever 16 is further configured to flex convergently internally to the sleeve 13 during the insertion of the tube T in order to position the locking end set back from the second stop 15. In particular, the coupling device 1 is arranged so that the flexing of the flexible lever 16 only occurs when a length of tube T equal to the predetermined length is inserted into the housing.

In this respect, and as shown in FIG. 3, the length of tube T inserted into the housing is less than the predetermined length, so that the tube T does not exert any force on the flexible lever 16. In this figure, the flexible lever 16 remains in abutment against the second stop 15 and requires cartridge 12 to be in its locked state.

In FIG. 4, the length of tube T inserted into the housing is equal to the predetermined length so that the tube exerts a force on the flexible lever 16 so as to cause the latter to flex in order to place the locking end 17 set back from the second stop 15. The flexing of the flexible lever 16 thus makes it possible to impose on the cartridge 12 its connection state.

Advantageously, the sleeve 13 comprises an end stop 18 opposite the free end 12a thereof, against which stop the tube T is intended to abut upon insertion into the housing by a length at least equal to the predetermined length.

Figure 6:
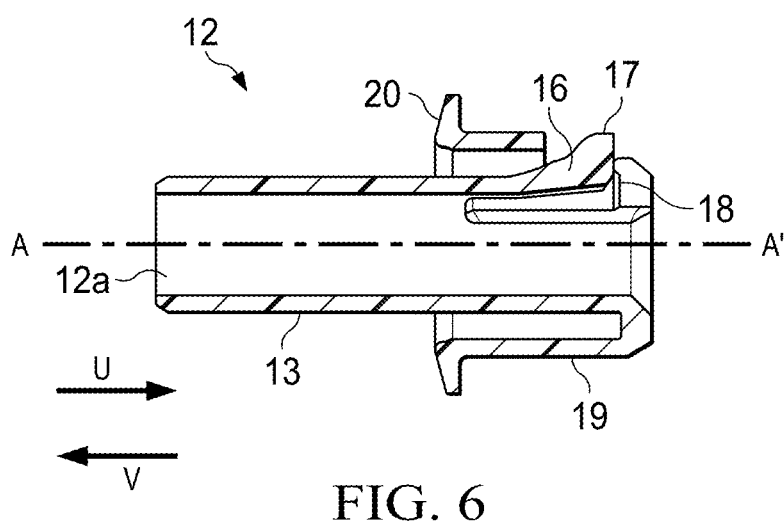
FIG. 6 is a schematic representation of a cartridge along a longitudinal cutting plane (passing through the main axis AA') and capable of being implemented in the coupling device according to the present disclosure.

Again according to this particular embodiment, the cartridge 12 (also shown in FIG. 6) comprises a liner 19 mechanically integral with the sleeve by one end of the sleeve opposite the free end 12a, and that further comprises a flange 20 against which the spring 14 exerts its force on the cartridge 12. More particularly, the liner 19 is arranged externally and coaxially to the sleeve 13. It is understood that the liner 19 is tubular in shape that extends, in the insertion direction, between a first end 19a and a second end 19b, the flange being arranged on the first end 19a (FIG. 4).

According to this exemplary embodiment, the spring 14 is compressed between the flange 20 and a support shoulder 26 formed on the inner surface of the hollow body 2.

Figure 7:
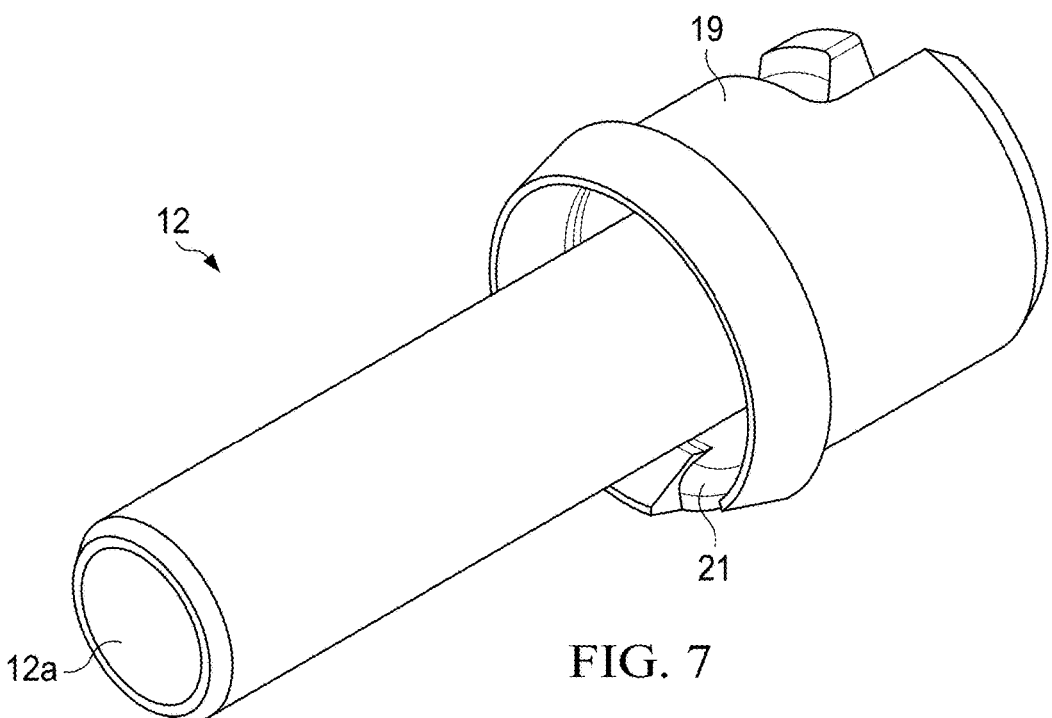
FIG. 7 is a schematic representation in perspective of a cartridge comprising a lug forcing a spacing in the locking ring.

The cartridge 12 may also comprise a lug 21 that, when the cartridge 12 is in the locked state, is located in a slot of the locking ring in order to impose a stress thereon, resulting in a spacing greater than a spacing in the free state of the locking ring 6 (FIG. 7).

Advantageously, a seal 22 can be inserted between the locking ring 6 and the flange 20 in order to ensure a sealing connection between the tube and the coupling device. The seal 22 can also provide a stop function against which the locking ring 6 abuts in the insertion direction as long as the cartridge is not in its connection state (it goes without saying that the seal 22 abuts against the flange of the cartridge). This aspect is, in particular, shown in FIGS. 1-4. In particular, as shown in FIGS. 1-3, the cartridge 12 is in the locked state. During its insertion through the opening, the tube T (forcibly) passes through the locking ring without causing the latter to slide as long as it is not in abutment against the end stop 18 of the cartridge 12. In FIG. 4, the cartridge 12 is in the connection state and therefore allows a movement of the locking ring engaged with the tube and cartridge as an assembly in the direction of insertion of the tube.

The coupling device may also comprise a dust cover ring 23 placed on or in the opening 4 and wherein a port is formed allowing the insertion of the tube T into the housing 3.

According to this particular embodiment, and as shown in FIG. 5, the dust cover ring 23 is arranged upstream of the first stop in the insertion direction. More particularly, the dust cover ring 23 is engaged with the hollow body 2 by snap-fastening.

Still advantageously, another O-ring 27 is arranged in the housing 3 upstream of the first stop 7 in the insertion direction u.

The first stop 7 may comprise a ring at least partially embedded in the dust cover ring 23.

Figure 8:
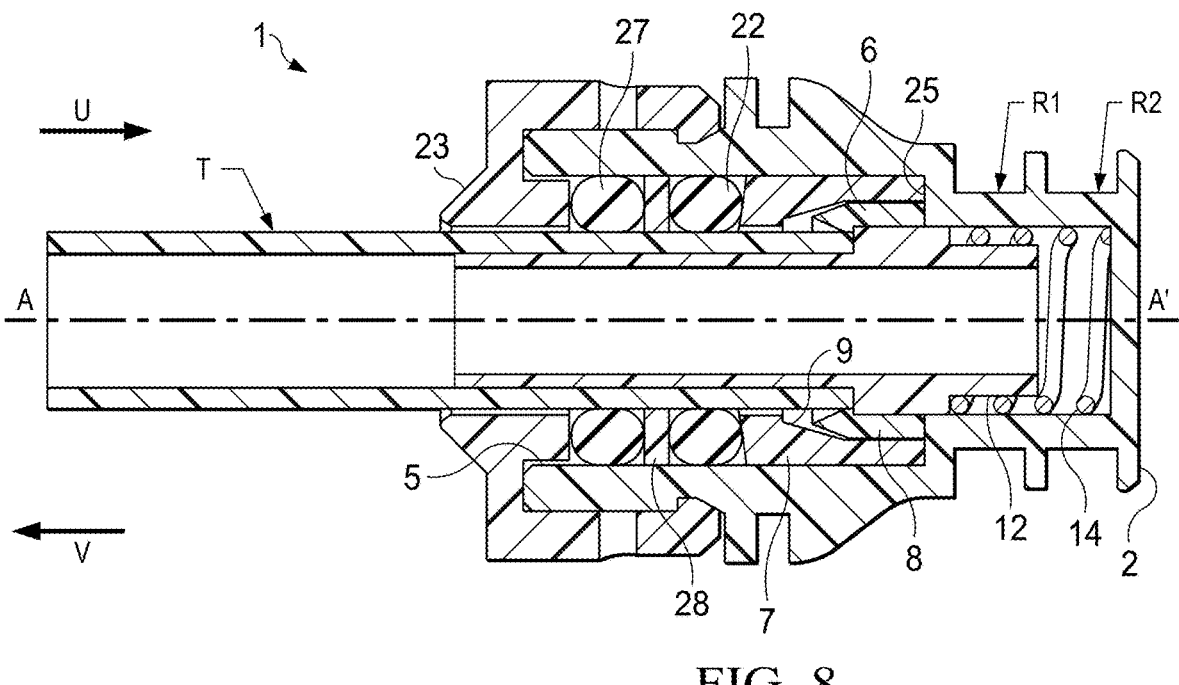
FIG. 8 is a schematic representation of a coupling device according to another exemplary embodiment of the present disclosure. In particular.

FIG. 8 is a schematic representation of a coupling device 1 according to another particular embodiment of the present disclosure. In particular, this other embodiment essentially uses the elements described above, although it does not comprise any locking means according to the embodiment described above.

More particularly, according to this other embodiment, the locking ring 6 and the cartridge 12 are arranged to adopt a state, referred to as the engagement state, wherein the locking ring 6, which is split, is imposing, by the cartridge 12, a constrained state resulting in a spacing, called the second spacing, greater than its spacing in the free state, referred to as the first spacing.

The cartridge 12 and the locking ring 6 are arranged so that the passage from the engagement state to the connection state of the cartridge 12 is induced by the insertion of the predetermined length D of tube T so as to cause the cartridge

12 to slide in the insertion direction and place the locking ring 6 in engagement with the tube T.

Figure 9:
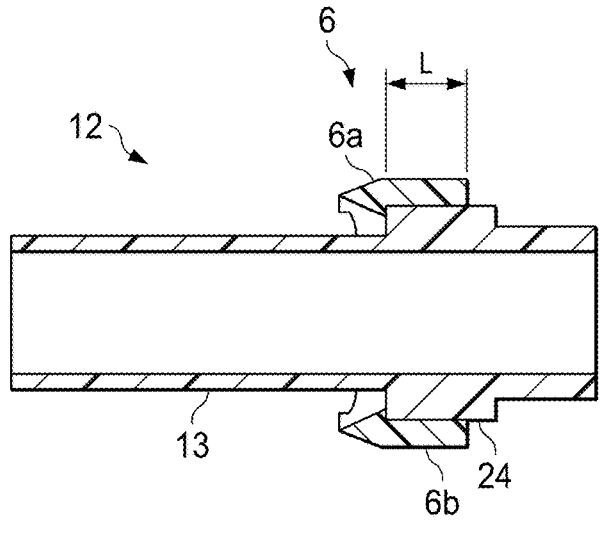
FIG. 9 is a schematic representation of a cartridge according to a cutting plane passing through the main axis AA' of the coupling device according to the other embodiment of the present disclosure.

In this respect, the cartridge 12 may comprise a collar 24 formed around the sleeve 13, while the locking ring 6 comprises, in the insertion direction u, a first section 6a and a second section 6b (FIG. 9).

It is understood that the collar 24 takes the form of a ring formed around the sleeve 13.

The first section 6a bears the tapered inner cross-section 8 making it possible to grip the outer surface of the tube, and thus be engaged with the tube.

The second section 6b, which extends over a length L, is intended to cooperate with the collar in order to be imposed on the second spacing when the cartridge is in the engaged state.

Thus, as shown in FIGS. 8 and 9, once the cartridge 12 is in the engaged state, the collar 24 is inserted by sliding into the second section 6b of the locking ring 6 in order to impose thereon the second spacing.

The inner surface 5 of the hollow body comprises, in the direction of insertion u, a first part of a first diameter and a second part of a second diameter that is smaller than the first diameter, so as to form an engagement shoulder 25 against which the second section 6b is intended to abut during the passage from the engagement state to the connection state of the cartridge in order to release the locking ring.

Figure 10:
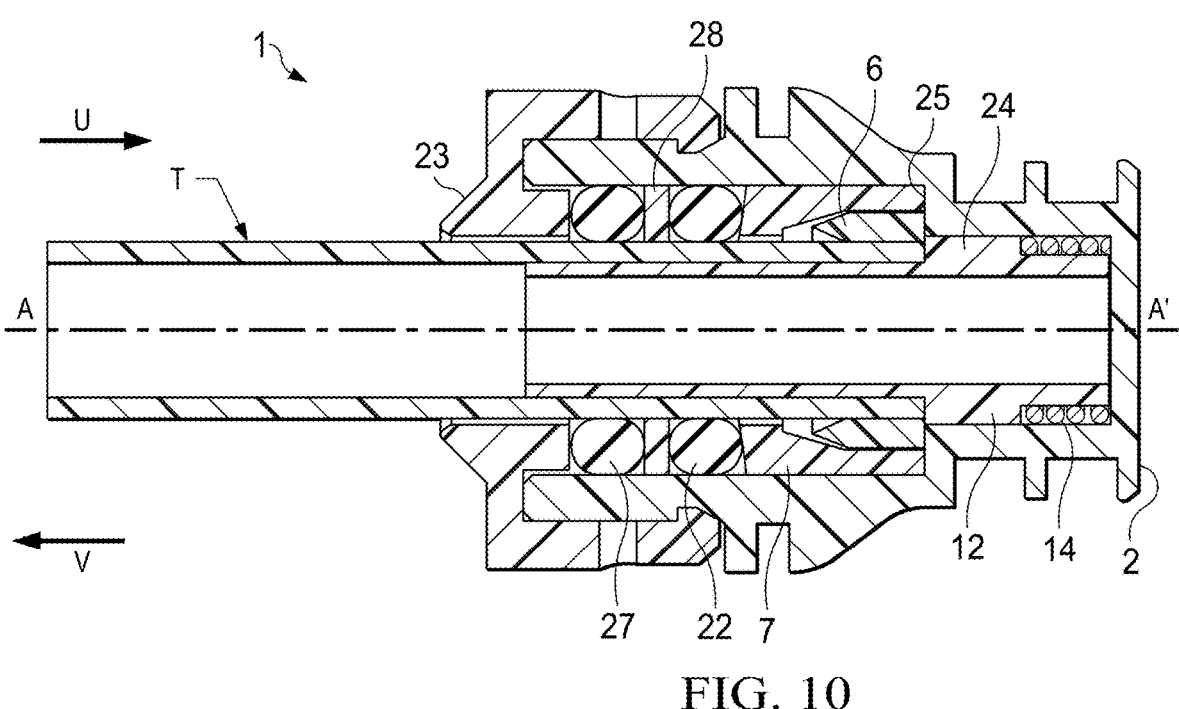
FIG. 10 is a schematic representation of a coupling device according to the other embodiment of the present disclosure, in particular.

Thus, during its insertion along the insertion direction u, the tube T exerts a force against the collar 24 leading to a sliding of the cartridge 12. This sliding, insofar as the locking ring 6 is in abutment against the engagement shoulder 25, results in disengagement of the collar 24 from the second section 6b of the locking ring 6. More particularly, the complete disengagement of the collar 24 in the second section 6b is effective after sliding of the cartridge over a length L (FIG. 10).

Once the disengagement of the collar 24 from the second section 6b is complete, the locking ring 6 is no longer constrained by the collar and is thus engaged with the tube T. In other words, the cartridge 12 is in the connected state.

According to this other exemplary embodiment, the spring 14 exerts its force against the collar 24. More particularly, the spring 14 is in compression between the collar 24 and the support shoulder 26 formed on the inner surface of the hollow body 2.

Again according to this other example, the dust cover ring 23 is snap-fastened outside the hollow body 2. In other words, the dust cover ring 23 covers the opening of the housing.

Furthermore, the seal 22 and the other seal 27 are arranged upstream of the first stop. In this respect, the seal 22 and the other seal 27 can be separated by a ring, called a separation ring 28.

Regardless of the example considered, the coupling device 1 allows verification of the correct coupling of a tube in cramped and dark environments. Moreover, this verification can be executed repeatedly and as many times as necessary without affecting the quality of the coupling.

Furthermore, the coupling device 1 can be adapted to compensate for the bevel effect resulting from a non-straight (non-orthogonal) cut of the tube end. In other words, the connected state of the cartridge may only occur when a given length of the tube has actually passed through the locking ring.

Of course, the present disclosure is not limited to the described exemplary embodiments and variant embodiments may be envisaged without departing from the scope of the invention as defined by the claims.

REFERENCES

[1] WO2021148737A1;
[2] FR3021089A1;
[3] EP2249072A1.

The invention claimed is:

1. A coupling device for a tube, comprising:

a hollow body defining a housing having an opening configured to receive a tube therein in a sliding manner along an insertion direction, the housing being delimited by an inner surface of the hollow body having a rotational symmetry about a main axis parallel to the insertion direction;

a locking ring arranged in the housing coaxially with the direction of insertion and configured to be in engagement with a tube inserted into the housing;

a first stop arranged in the housing upstream of the locking ring in the direction of insertion and against which the ring is capable of abutting;

a cartridge against which the tube, already engaged with the locking ring and inserted by a predetermined length, abuts upon insertion of the tube to impose on the cartridge a connection state, the cartridge in the connection state being able to slide between a first position and a second position to accompany the sliding of the tube engaged with the locking ring, the passage of the cartridge from the second position to the first position forcing the tube to slide in an extraction direction, opposite to the insertion direction, to abut the locking ring against the first stop, while the passage of the cartridge from the first position to the second position allows a sliding of the tube in the insertion direction to place the locking ring at a distance from the first stop, the cartridge comprising a sleeve extending from a free end in the direction of insertion, the sleeve guiding the tube during insertion of the tube into the housing, the cartridge configured to be held by at least one locking feature in a locked state in which any sliding of the cartridge toward the second position is prohibited, the passage from the locked state to the connection state being induced by the insertion, in the direction of insertion, of a length of tube equal to the predetermined length; and a spring exerting a force against the cartridge in the direction of extraction to force the cartridge, in the connection state, to adopt the first position.

2. The coupling device of claim 1, wherein the locking feature comprises a second stop and a flexible lever, the second stop being formed on the inner surface, the flexible lever, supported by the sleeve, extending divergently with respect to the sleeve and comprising a blocking end configured to abut the second stop when the cartridge is in the locked state, the flexible lever configured to bend convergently inside the sleeve during insertion of the tube to position the blocking end so as to be set back from the second stop.

3. The coupling device of claim 2, wherein the sleeve comprises an end stop opposite the free end thereof, against which stop the tube abuts upon insertion of a length of the tube at least equal to the predetermined length.

4. The coupling device of claim 3, wherein the cartridge comprises a liner mechanically secured to the sleeve via an end of the sleeve opposite the free end, the liner comprising a flange against which the spring exerts a force on the cartridge.

5. The coupling device of claim 4, wherein the cartridge comprises a lug that, when the cartridge is in the locked state, is located in a slot of the locking ring to impose a stress thereon, resulting in a spacing greater than a spacing in the free state of the locking ring.

6. The coupling device of claim 5, further comprising a dust cover ring in the opening upstream of the first stop in the direction of insertion.

7. The coupling device of claim 6, further comprising an O-ring in the housing upstream of the first stop in the direction of insertion.

8. The coupling device of claim 7, wherein the first stop forms a ring at least partially embedded in the dust cover ring.

9. The coupling device of claim 8, further comprising another O-ring downstream of the locking ring in the direction of insertion.

10. The coupling device of claim 9, wherein the inner surface of the hollow body comprises an abutment shoulder against which the spring bears.

11. The coupling device of claim 6, wherein the dust cover ring is engaged with the hollow body by way of a snap-fitting.

12. The coupling device of claim 6, wherein the first stop forms a ring at least partially embedded in the dust cover ring.

13. The coupling device of claim 1, wherein the cartridge comprises a liner mechanically secured to the sleeve via an end of the sleeve opposite the free end, the liner comprising a flange against which the spring exerts a force on the cartridge.

14. The coupling device of claim 1, wherein the cartridge comprises a lug that, when the cartridge is in the locked state, is located in a slot of the locking ring to impose a stress thereon, resulting in a spacing greater than a spacing in the free state of the locking ring.

15. The coupling device of claim 1, further comprising a dust cover ring in the opening upstream of the first stop in the direction of insertion.

16. The coupling device of claim 15, further comprising an O-ring in the housing upstream of the first stop in the direction of insertion.

17. The coupling device of claim 1, further comprising an O-ring downstream of the locking ring in the direction of insertion.

18. The coupling device of claim 1, wherein the inner surface of the hollow body comprises an abutment shoulder against which the spring bears.

\* \* \* \* \*